US012266317B2

(12) United States Patent
Fan et al.

(10) Patent No.: US 12,266,317 B2
(45) Date of Patent: Apr. 1, 2025

(54) PIXEL CIRCUIT, DRIVING METHOD, AND DISPLAY DEVICE

(71) Applicants: Yunnan Invensight Optoelectronics Technology Co., Ltd., Yunnan (CN); BOE TECHNOLOGY GROUP CO., LTD., Beijing (CN)

(72) Inventors: Longfei Fan, Beijing (CN); Xiaochuan Chen, Beijing (CN); Pengcheng Lu, Beijing (CN)

(73) Assignees: Yunnan Invensight Optoelectronics Technology Co., Ltd., Yunnan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/028,026

(22) PCT Filed: Jun. 24, 2022

(86) PCT No.: PCT/CN2022/101046
§ 371 (c)(1),
(2) Date: Mar. 23, 2023

(87) PCT Pub. No.: WO2023/245603
PCT Pub. Date: Dec. 28, 2023

(65) Prior Publication Data
US 2024/0304153 A1 Sep. 12, 2024

(51) Int. Cl.
*G09G 3/3233* (2016.01)
*G09G 3/3291* (2016.01)

(52) U.S. Cl.
CPC ......... *G09G 3/3291* (2013.01); *G09G 3/3233* (2013.01); *G09G 2300/0819* (2013.01); *G09G 2300/0852* (2013.01); *G09G 2310/0251* (2013.01)

(58) Field of Classification Search
None
See application file for complete search history.

(56) References Cited

U.S. PATENT DOCUMENTS 9,123,294 B2 * 9/2015 Han .................... G09G 3/3233
2013/0043802 A1 2/2013 Han et al.
2017/0116918 A1 4/2017 Dong et al.
(Continued)

FOREIGN PATENT DOCUMENTS

CN 102956192 A 3/2013
CN 104680978 A 6/2015
(Continued)

*Primary Examiner* — Brian M Butcher
(74) *Attorney, Agent, or Firm* — WHDA, LLP

(57) ABSTRACT

A pixel circuit, a driving method, and a display device. The pixel circuit includes a light-emitting element, a data writing circuit, a first control circuit, a driving circuit, a first power storage circuit, and a second power storage circuit. The first control circuit is configured to write a first initial voltage provided by a first initial voltage terminal into a first electrode of the light-emitting element under control of a first control signal provided by a first control terminal in a non-light-emitting phase. The driving circuit drives the light-emitting element to emit light under the control of a potential of a control terminal of the driving circuit. The present disclosure enhances the contrast in the non-light-emitting phase.

9 Claims, 4 Drawing Sheets

(56) References Cited

U.S. PATENT DOCUMENTS

| | | | |
|---|---|---|---|
| 2019/0189724 | A1 | 6/2019 | Xu |
| 2020/0184893 | A1 | 6/2020 | Dong |

FOREIGN PATENT DOCUMENTS

| | | | |
|---|---|---|---|
| CN | 104809989 | A | 7/2015 |
| CN | 106981269 | A | 7/2017 |
| CN | 108206008 | B | 12/2019 |
| CN | 111933080 | A | 11/2020 |
| CN | 113870775 | A | 12/2021 |
| CN | 114882838 | A | 8/2022 |

* cited by examiner

PIXEL CIRCUIT, DRIVING METHOD, AND DISPLAY DEVICE

CROSS-REFERENCE TO RELATED APPLICATION

The present application is the U.S. national phase of PCT Application No. PCT/CN2022/101046 filed on Jun. 24, 2022, the entire content of which is incorporated herein by reference.

TECHNICAL FIELD

The present disclosure relates to the technical field of displays, and more particularly, to a pixel circuit, a driving method, and a display device.

BACKGROUND

In recent years, with the development of intelligent display technologies, the organic light emitting diode (OLED) has become one of the hotspots in the field of display research. With the thinning of the display panel, the narrowing of the frame and the development of low-frequency technologies of the display screen, the need for the optimization design of display panels becomes more and more serious.

A pixel circuit in related art includes a driving circuit and a light-emitting element, and the driving circuit drives the light-emitting element to emit light according to a data voltage provided by a data line. The pixel circuit in related art cannot enhance the contrast in the non-light-emitting phase.

SUMMARY

In an aspect, an embodiment of the present disclosure provides a pixel circuit, including a light-emitting element, a data writing circuit, a first control circuit, a driving circuit, a first power storage circuit, and a second power storage circuit; wherein the first control circuit is electrically connected to a first control terminal, a first electrode of the light-emitting element and a first initial voltage terminal, and is configured to write a first initial voltage provided by the first initial voltage terminal into the first electrode of the light-emitting element under control of a first control signal provided by the first control terminal in a non-light-emitting phase;

a first terminal of the first power storage circuit is electrically connected to a control terminal of the driving circuit, a second terminal of the first power storage circuit is electrically connected to a first terminal of the driving circuit, and the first power storage circuit is configured to store electric energy;

a first terminal of the second power storage circuit is electrically connected to the first terminal of the driving circuit, a second terminal of the second power storage circuit is electrically connected to a first voltage terminal, and the second power storage circuit is configured to store electric energy;

the data writing circuit is electrically connected to a writing control terminal, a data line and the control terminal of the driving circuit, and is configured to write a data voltage provided by the data line into the control terminal of the driving circuit under control of a writing control signal provided by the writing control terminal;

a second terminal of the driving circuit is electrically connected to the first electrode of the light-emitting element, and the driving circuit is configured to drive the light-emitting element to emit light under control of a potential of the control terminal of the driving circuit;

a second electrode of the light-emitting element is electrically connected to a second voltage terminal.

Optionally, in at least one embodiment of the present disclosure, the pixel circuit further includes a reset circuit; wherein the reset circuit is electrically connected to a reset control terminal, a second initial voltage terminal and the control terminal of the driving circuit, and is configured to write a second initial voltage provided by the second initial voltage terminal into the control terminal of the driving circuit under control of a reset control signal provided by the reset control terminal.

Optionally, in at least one embodiment of the present disclosure, the pixel circuit further includes a light-emitting control circuit; wherein the light-emitting control circuit is electrically connected to a light-emitting control terminal, the first voltage terminal and the first terminal of the driving circuit, and is configured to control the first voltage terminal to be connected to the first terminal of the driving circuit under control of a light-emitting control signal provided by the light-emitting control terminal.

Optionally, the first control circuit includes a first transistor;

a control electrode of the first transistor is electrically connected to the first control terminal, a first electrode of the first transistor is electrically connected to the first initial voltage terminal, and a second electrode of the first transistor is electrically connected to the first electrode of the light-emitting element.

Optionally, the first transistor is an n-type transistor.

Optionally, the first power storage circuit includes a first capacitor, and the second power storage circuit includes a second capacitor;

a first terminal of the first capacitor is electrically connected to the control terminal of the driving circuit, and a second terminal of the first capacitor is electrically connected to the first terminal of the driving circuit;

a first terminal of the second capacitor is electrically connected to the first terminal of the driving circuit, and a second terminal of the second capacitor is electrically connected to a first voltage terminal.

Optionally, the data writing circuit includes a second transistor, and the driving circuit includes a driving transistor;

a control electrode of the second transistor is electrically connected to the writing control terminal, a first electrode of the second transistor is electrically connected to the data line, and a second electrode of the second transistor is electrically connected to the control terminal of the driving circuit;

a control electrode of the driving transistor is the control terminal of the driving circuit, a first electrode of the driving circuit is the first terminal of the driving circuit, and a second electrode of the driving circuit is the second terminal of the driving circuit.

Optionally, the reset circuit includes a third transistor;

a control electrode of the third transistor is electrically connected to the reset control terminal, a first electrode of the third transistor is electrically connected to the second initial voltage terminal, and a second electrode of the third transistor is electrically connected to the control terminal of the driving circuit.

Optionally, the light-emitting control circuit includes a fourth transistor;

a control electrode of the fourth transistor is electrically connected to the light-emitting control terminal, a first electrode of the fourth transistor is electrically connected to the first voltage terminal, and a second electrode of the fourth transistor is electrically connected to the first terminal of the driving circuit.

Optionally, the first transistor is an n-type transistor, and the fourth transistor is a p-type transistor; the first control terminal is configured to provide a first control signal, and the light-emitting control terminal is configured to provide a light-emitting control signal:

in a display cycle, a time period for which a potential of a first control signal connected to the control electrode of the first transistor is maintained at a high voltage is longer than a time period for which a potential of a light-emitting control signal connected to the control electrode of the fourth transistor is maintained at the high voltage.

In a second aspect, an embodiment of the present disclosure provides a driving method applied to the pixel circuit as described above, wherein a display cycle includes a non-light-emitting phase and a light-emitting phase which are sequentially set, and the non-light-emitting phase includes an initialization phase, a self-discharge phase, a data writing phase and a light-emitting phase which are sequentially set; the driving method includes:

in the initialization phase, the self-discharge phase and the data writing phase, a first control circuit writes a first initial voltage provided by a first initial voltage terminal into a first electrode of a light-emitting element under control of a first control signal to control the light-emitting element not to emit light, and clears and shunts residual charge of the first electrode of the light-emitting element; and in the data writing phase, a data writing circuit writes a data voltage provided by a data line into a control terminal of a driving circuit under control of a writing control signal.

Optionally, the pixel circuit further includes a reset circuit; the driving method further includes:

in the initialization phase, a reset circuit writes a second initial voltage provided by a second initial voltage terminal into the control terminal of the driving circuit under control of a reset control signal, so that at the start of the self-discharge phase, the driving circuit controls a first terminal of the driving circuit to be connected to a second terminal of the driving circuit under control of a potential of the control terminal of the driving circuit; and at the start of the self-discharge phase, the driving circuit controls the first terminal of the driving circuit to be connected to the second terminal of the driving circuit under control of the potential of the control terminal of the driving circuit, and changes a potential of the first terminal of the driving circuit by discharge until the driving circuit controls the first terminal of the driving circuit to be disconnected from the second terminal of the driving circuit.

Optionally, the pixel circuit further includes a light-emitting control circuit, and the driving method further includes:

in the initialization phase, the light-emitting control circuit controls a first voltage terminal to be connected to the first terminal of the driving circuit under control of a light-emitting control signal;

in the self-discharge phase and the data writing phase, the light-emitting control circuit controls the first voltage terminal to be disconnected from the first terminal of the driving circuit under control of the light-emitting control signal; and in the light-emitting phase, the first control circuit disconnects the first initial voltage terminal from the first electrode of the light-emitting element under control of a first control signal, the light-emitting control circuit controls the first voltage terminal to be connected to the first terminal of the driving circuit under control of the light-emitting control signal, and the driving circuit drives the light-emitting element to emit light.

Optionally, in the display cycle, a time period for which the first control circuit writes the first initial voltage into the first electrode of the light-emitting element is longer than a time period for which the light-emitting control circuit controls the first voltage terminal to be disconnected from the first terminal of the driving circuit.

In a third aspect, an embodiment of the present disclosure provides a display device including the pixel circuit as described above.

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

The transistors used in all the embodiments of the present disclosure may be triodes, thin film transistors or field effect transistors, or other devices with the same characteristics. In embodiments of the present disclosure, to distinguish the two electrodes of a transistor other than the control electrode, one of the electrodes is referred to as a first electrode while the other one is referred to as a second electrode.

In practical operation, when the transistor is a triode, the control electrode may be the base, the first electrode may be the collector, and the second electrode may be the emitter; alternatively, the control electrode may be the base, the first electrode may be the emitter, and the second electrode may be the collector.

In practical operation, when the transistor is a thin film transistor or a field effect transistor, the control electrode may be the gate, the first electrode may be the drain, and the second electrode may be the source; alternatively, the control electrode may be the gate, the first electrode may the source, and the second electrode may be the drain.

Figure 1:
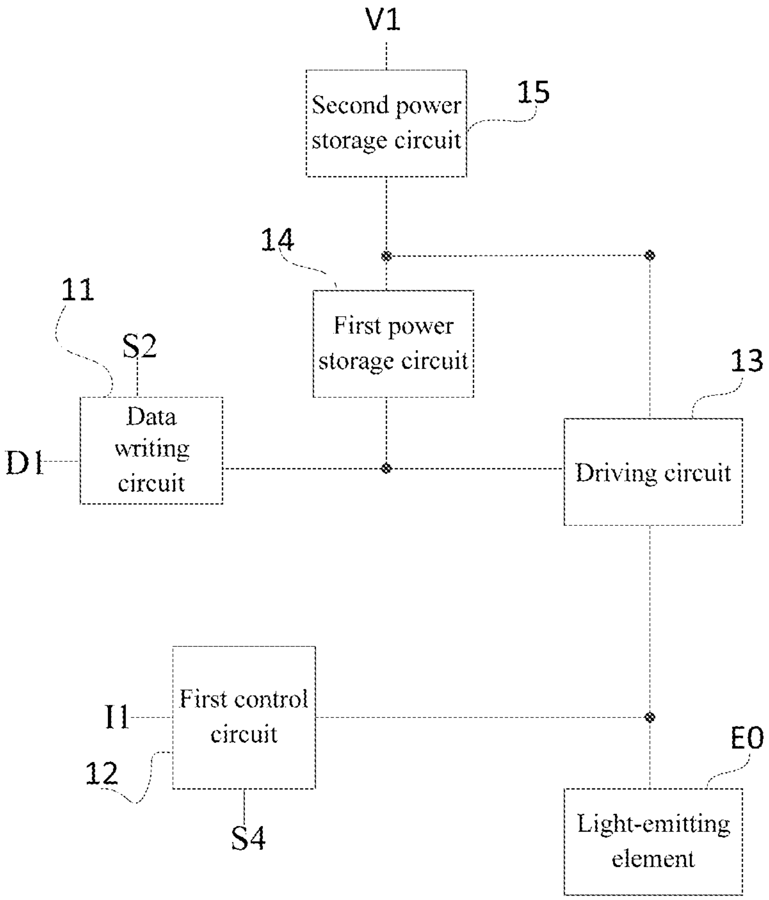
FIG. 1 is a structure diagram of a pixel circuit according to an embodiment of the present disclosure.

As shown in FIG. 1, a pixel circuit according to an embodiment of the present disclosure includes a light-emitting element E0, a data writing circuit 11, a fast control circuit 12, a driving circuit 13, a first power storage circuit 14, and a second power storage circuit 15; wherein the first control circuit 12 is electrically connected to a first control terminal S4, a first electrode of the light-emitting element E0 and a first initial voltage terminal I1, and is configured to write a first initial voltage provided by the first initial voltage terminal I1 into the first electrode of the light-emitting element E0 under control of a first control signal provided by the first control terminal S4 in a non-light-emitting phase;

a first terminal of the first power storage circuit 14 is electrically connected to a control terminal of the driving circuit 13, a second terminal of the first power storage circuit 14 is electrically connected to a first terminal of the driving circuit 13, and the first power storage circuit 14 is configured to store electric energy;

a first terminal of the second power storage circuit 15 is electrically connected to the first terminal of the driving circuit 13, a second terminal of the second power storage circuit 15 is electrically connected to a first voltage terminal V1, and the second power storage circuit 15 is configured to store electric energy;

the data writing circuit 11 is electrically connected to a writing control terminal S2, a data line D1 and the control terminal of the driving circuit 13, and is configured to write a data voltage provided by the data line D1 into the control terminal of the driving circuit 13 under control of a writing control signal provided by the writing control terminal S2;

a second terminal of the driving circuit 13 is electrically connected to the first electrode of the light-emitting element E0, and the driving circuit 13 is configured to drive the light-emitting element E0 to emit light under control of a potential of the control terminal of the driving circuit; a second electrode of the light-emitting element E0 is electrically connected to a second voltage terminal V2.

In at least one embodiment of the present disclosure, the first voltage terminal V1 may be a power supply voltage terminal, and the second voltage terminal V2 may be connected to a common electrode voltage, but this is not limiting.

In at least one embodiment of the present disclosure, the first initial voltage terminal may be a ground terminal, but this is not limiting.

When the pixel circuit of at least one embodiment of the present disclosure as shown in FIG. 1 is in operation, in a non-light-emitting phase, the first control circuit 12 writes the first initial voltage into the first electrode of the light-emitting element E0 under control of the first control signal to control the light-emitting element E0 not to emit light;

the transistor included in the first control circuit 12 is a shunt device which, in the non-light-emitting phase, shunts the current, so as to increase the contrast.

In at least one embodiment of the present disclosure, the non-light-emitting phase may be a period of time other than a light-emitting phase included in a display cycle which may be the time of one frame, but this is not limiting.

When the pixel circuit of at least one embodiment of the present disclosure as shown in FIG. 1 is in operation, a display cycle may include a non-light-emitting phase and a light-emitting phase which are sequentially set, and the non-light-emitting phase may include an initialization phase, a self-discharge phase, a data writing phase and a light-emitting phase which are sequentially set:

in the initialization phase, the self-discharge phase and the data writing phase, the first control circuit 12 writes the first initial voltage provided by the first initial voltage terminal I1 into the first electrode of the light-emitting element E0 under control of the first control signal to control the light-emitting element E0 not to emit light; the transistor included in the first control circuit 12 is a shunt device which shunts the current, so as to increase the contrast;

in the data writing phase, the data writing circuit 11 writes the data voltage provided by the data line D1 into the control terminal of the driving circuit 13 under control of the writing control signal.

Figure 2:
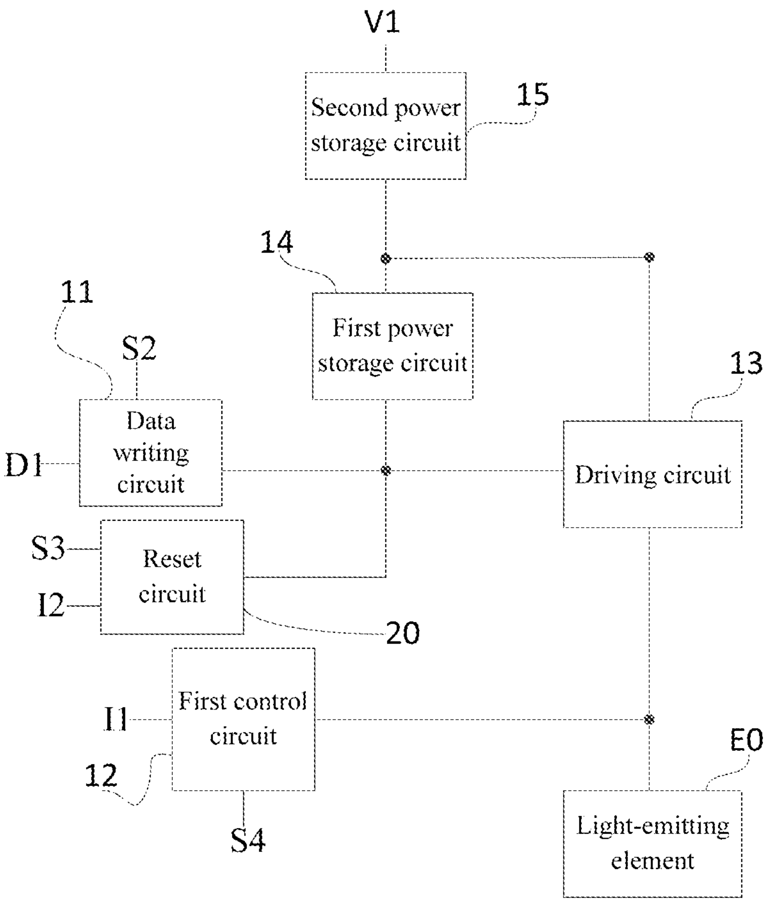
FIG. 2 is a structure diagram of a pixel circuit according to at least one embodiment of the present disclosure.

As shown in FIG. 2, on the basis of at least one embodiment of the pixel circuit shown in FIG. 1, in at least one embodiment of the present disclosure, the pixel circuit further includes a reset circuit 20;

the reset circuit 20 is electrically connected to a reset control terminal S3, a second initial voltage terminal I2 (Vofs) and the control terminal of the driving circuit 13, and is configured to write a second initial voltage provided by the second initial voltage terminal I2 into the control terminal of the driving circuit 13 under control of a reset control signal provided by the reset control terminal S3.

When the pixel circuit of at least one embodiment of the present disclosure as shown in FIG. 2 is in operation, in the initialization phase, the reset circuit 20 writes the second initial voltage provided by the second initial voltage terminal I2 into the control terminal of the driving circuit 13 under control of the reset control signal, so that at the start of the self-discharge phase, the driving circuit 13 controls the first terminal of the driving circuit 13 to be connected to the second terminal of the driving circuit 13 under control of a potential of the control terminal of the driving circuit; and at the start of the self-discharge phase, the driving circuit 13 controls the first terminal of the driving circuit 13 to be connected to the second terminal of the driving circuit 13 under control of the potential of the control terminal of the driving circuit, and changes a potential of the first terminal of the driving circuit 13 by discharge until the driving circuit 13 controls the first terminal of the driving circuit 13 to be disconnected from the second terminal of the driving circuit 13.

Figure 3:
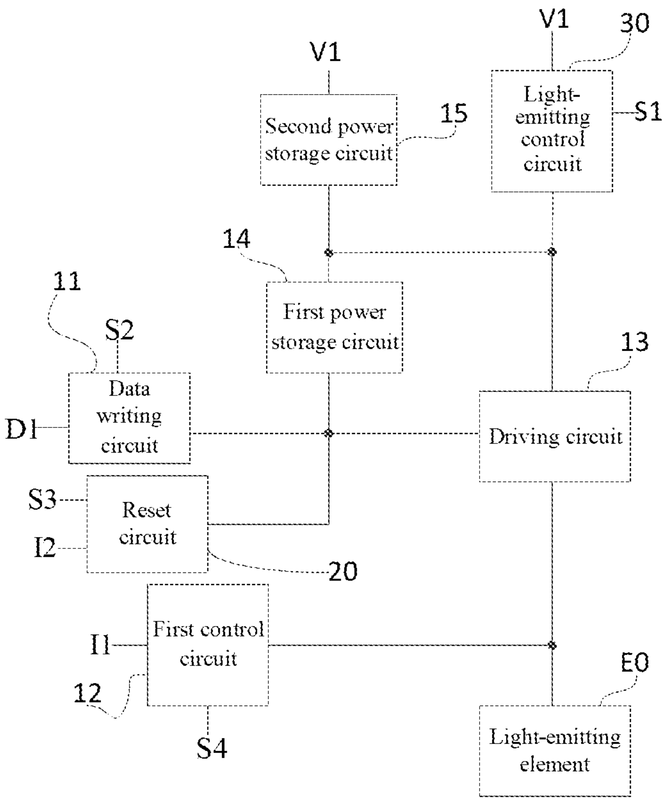
FIG. 3 is a structure diagram of a pixel circuit according to at least one embodiment of the present disclosure.

As shown in FIG. 3, on the basis of at least one embodiment of the pixel circuit shown in FIG. 2, in at least one embodiment of the present disclosure, the pixel circuit further includes a light-emitting control circuit 30;

the light-emitting control circuit 30 is electrically connected to a light-emitting control terminal S1, the first voltage terminal V1 and the first terminal of the driving circuit 13, and is configured to control the first voltage terminal V1 to be connected to the first terminal of the driving circuit 13 under control of a light-emitting control signal provided by the light-emitting control terminal S1.

When the pixel circuit of at least one embodiment of the present disclosure as shown in FIG. 3 is in operation, in the light-emitting phase, the first control circuit 12 disconnects the first initial voltage terminal I1 from the first electrode of the light-emitting element E0 under control of the first control signal, the light-emitting control circuit 30 controls the first voltage terminal V1 to be connected to the first terminal of the driving circuit 13 under control of the light-emitting control signal, and the driving circuit 13 drives the light-emitting element E0 to emit light.

Optionally, the first control circuit includes a first transistor;

a control electrode of the first transistor is electrically connected to the first control terminal, a first electrode of the first transistor is electrically connected to the first initial voltage terminal, and a second electrode of the first transistor is electrically connected to the first electrode of the light-emitting element.

Optionally, the first power storage circuit includes a first capacitor, and the second power storage circuit includes a second capacitor;

a first terminal of the first capacitor is electrically connected to the control terminal of the driving circuit, and a second terminal of the first capacitor is electrically connected to the first terminal of the driving circuit;

a first terminal of the second capacitor is electrically connected to the first terminal of the driving circuit, and a second terminal of the second capacitor is electrically connected to a first voltage terminal.

Optionally, the data writing circuit includes a second transistor, and the driving circuit includes a driving transistor;

a control electrode of the second transistor is electrically connected to the writing control terminal, a first electrode of the second transistor is electrically connected to the data line, and a second electrode of the second transistor is electrically connected to the control terminal of the driving circuit;

a control electrode of the driving transistor is the control terminal of the driving circuit, a first electrode of the driving circuit is the first terminal of the driving circuit, and a second electrode of the driving circuit is the second terminal of the driving circuit.

Optionally, the reset circuit includes a third transistor;

a control electrode of the third transistor is electrically connected to the reset control terminal, a first electrode of the third transistor is electrically connected to the second initial voltage terminal, and a second electrode of the third transistor is electrically connected to the control terminal of the driving circuit.

Optionally, the light-emitting control circuit includes a fourth transistor;

a control electrode of the fourth transistor is electrically connected to the light-emitting control terminal, a first electrode of the fourth transistor is electrically connected to the first voltage terminal, and a second electrode of the fourth transistor is electrically connected to the first terminal of the driving circuit.

Optionally, the light-emitting element may be an organic light-emitting diode, the first electrode of the light-emitting element may be an anode of the organic light-emitting diode, and the second electrode of the light-emitting element may be a cathode of the organic light-emitting diode, but this is not limiting.

Figure 4:
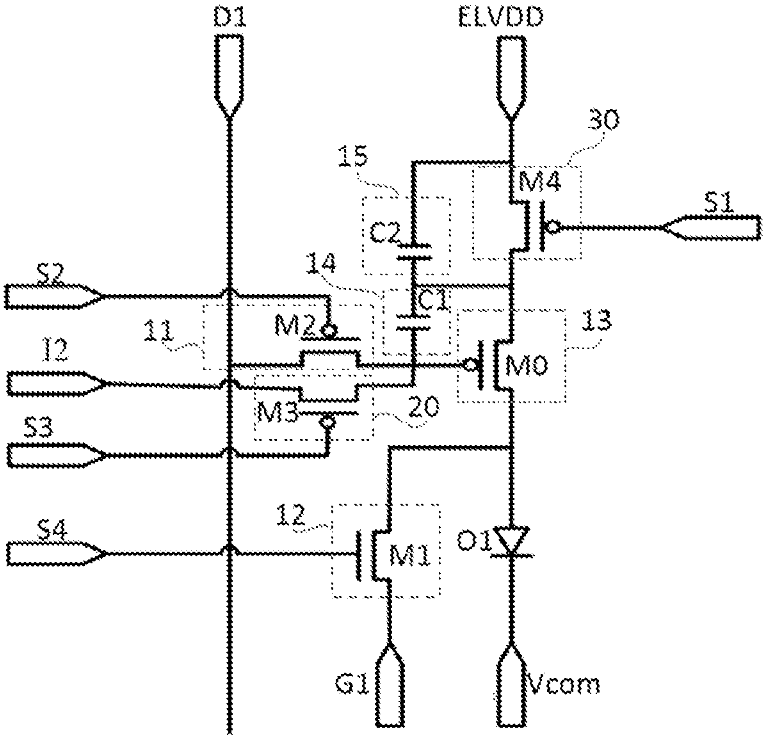
FIG. 4 is a circuit diagram of a pixel circuit according to an embodiment of the present disclosure.

As shown in FIG. 4, on the basis of at least one embodiment of the pixel circuit shown in FIG. 3, the light-emitting element is an organic light-emitting diode O1; the driving circuit 13 includes a driving transistor M0;

the first control circuit 12 includes a first transistor M1;

a gate of the first transistor M1 is electrically connected to the first control terminal S4, a source of the first transistor M1 is electrically connected to a ground terminal GI, and a drain of the first transistor M1 is electrically connected to an anode of the organic light-emitting diode O1;

the first power storage circuit 14 includes a first capacitor C1, and the second power storage circuit 15 includes a second capacitor C2;

a first terminal of the first capacitor C1 is electrically connected to a gate of the driving transistor M0, and a second terminal of the first capacitor C1 is electrically connected to a source of the driving transistor M0;

a first terminal of the second capacitor C2 is electrically connected to the source of the driving transistor M0, and a second terminal of the second capacitor C2 is electrically connected to a power supply voltage terminal ELVDD; the power supply voltage terminal ELVDD is configured to provide a power supply voltage Vdd;

the data writing circuit 11 includes a second transistor M2;

a gate of the second transistor M2 is electrically connected to the writing control terminal S2, a source of the second transistor M2 is electrically connected to the data line D1, and a drain of the second transistor M2 is electrically connected to the gate of the driving transistor M0;

the reset circuit 20 includes a third transistor M3;

a gate of the third transistor M3 is electrically connected to the reset control terminal S3, a source of the third transistor M3 is electrically connected to the second initial voltage terminal I2, and a drain of the third transistor M3 is electrically connected to the gate of the driving transistor M0.

the light-emitting control circuit 30 includes a fourth transistor M4;

a gate of the fourth transistor M4 is electrically connected to the light-emitting control terminal S1, a source of the fourth transistor M4 is electrically connected to the power supply voltage terminal ELVDD, and a drain of the fourth transistor M4 is electrically connected to the source of the driving transistor M0;

the cathode of the organic light-emitting diode O1 is connected to a common electrode voltage Vcom.

In at least one embodiment of the present disclosure, the first transistor is an n-type transistor, and the fourth transistor is a p-type transistor; the first control terminal is configured to provide a first control signal, and the light-emitting control terminal is configured to provide a light-emitting control signal;

in a display cycle, a time period for which a potential of a first control signal connected to the control electrode of the first transistor is maintained at a high voltage is longer than a time period for which a potential of a light-emitting control signal connected to the control electrode of the fourth transistor is maintained at the high voltage, so that an on-time of the first transistor is longer than an off-time of the fourth transistor.

In at least one embodiment of the pixel circuit shown in FIG. 4, the first initial voltage terminal I1 is the ground terminal GI, but this is not limiting.

In at least one embodiment of the pixel circuit shown in FIG. 4, M0, M2, M3 and M4 are all p-type transistors, and M1 is an n-type transistor, but this is not limiting.

In at least one embodiment of the pixel circuit of the present disclosure shown in FIG. 4, M1 is an n-type transistor, so as to enlarge the dynamic range of the anode voltage of the organic light-emitting diode O1.

In specific implementation, if M1 is a p-type transistor, the substrate of M1 is connected to a positive voltage, and a withstand voltage of M1 is generally 8 V, then M1 is easily damaged. For example, if the substrate of M1 is connected to a voltage of 5 V there is a risk of damage to M1 when the anode voltage of O1 is less than −3 V.

However, in at least one embodiment of the present disclosure, M1 is configured to be an n-type transistor, and the substrate of M1 is grounded or connected to a negative voltage, so that the dynamic range of the organic light-emitting diode O1 can be enlarged.

Figure 5:
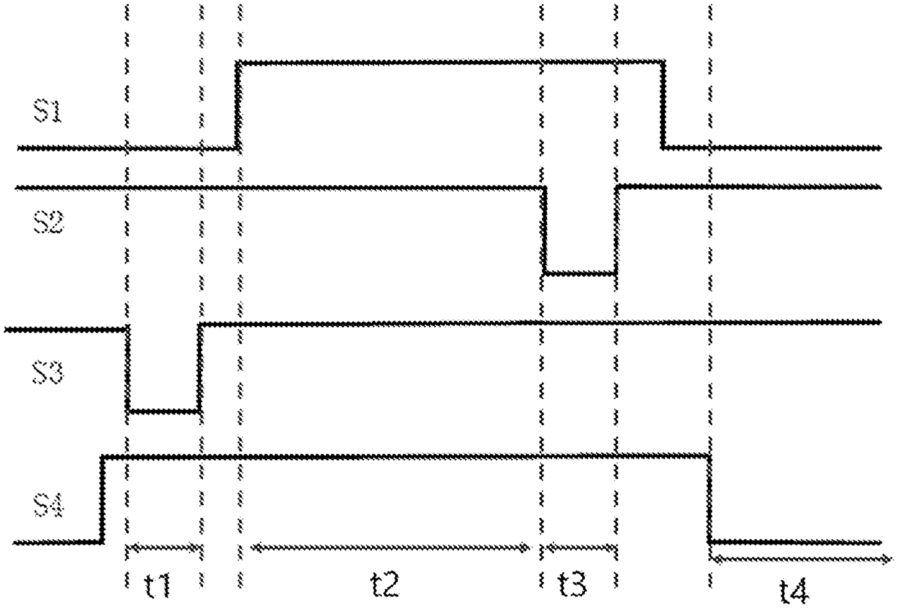
FIG. 5 is an operational timing diagram of the pixel circuit of the present disclosure as shown in FIG. 4.

As shown in FIG. 5, when the pixel circuit of at least one embodiment of the present disclosure as shown in FIG. 4 is in operation, the display cycle includes an initialization phase t1, a self-discharge phase t2, a data writing phase t3 and a light-emitting phase t4 which are successively set.

In the initialization phase t1, S1 provides a low voltage signal, S2 provides a high voltage signal, S3 provides a low voltage signal, S4 provides a high voltage signal, I2 provides a reset voltage Vofs, and the reset voltage Vofs is a low voltage; M2 is turned off, M4 is turned on, M3 is turned on and M1 is turned on, so as to write the low voltage signal provided by I2 into the gate of M0 and write the power supply voltage Vdd into the source of M0; a gate-source voltage Vgs of M0 is an initial gate-source voltage Vini, and Vini is equal to Vdd-Vofs; O1 does not emit light.

In the self-discharge phase t2, S1 provides a high voltage signal, S2 provides a high voltage signal, S3 provides a high voltage signal, S4 provides a high voltage signal, M4 is turned off, M2 is turned off, M3 is tuned off, M1 is tuned on, and the source of M0 is in a floating state; since in the initialization phase t1, the gate of M0 is written with a low voltage, M0 starts, and M0 starts a self-discharge operation; O1 does not emit light;

In the self-discharge phase t2, since the gate of the M0 is floating, the gate voltage of the M0 decreases simultaneously with the source voltage of M0, and C1 maintains the gate-source voltage Vgs of M0 as Vini.

Due to the back-gate effect, $|V_{TH\_EF}|=a\times(Vdd-Vs)+|Vth|$; where a is the coefficient of the back-gate effect, and Vs is the source voltage of M0.

With the decrease of Vs, Vgs remains at Vini at this moment, and when |VTH_EF| increases to Vini, the discharge is stopped, at this moment, a×(Vdd−Vs)+|Vth|=Vini;

$$Vs=Vdd+(|Vth|-Vini)/a;\ Vg=Vdd+(|Vth|-Vini)/a-Vini;$$ where $Vg$ is the gate voltage of $M0$.

In the data writing phase t3, S1 provides a high voltage signal, S2 provides a low voltage signal, S3 provides a high voltage signal, S4 provides a high voltage signal, and M1 is turned on, so as to control O1 not to emit light; M4 is turned off, M3 is turned off, and M2 is turned on; the data line D1 provides a data voltage Vdata to the gate of M0; the gate voltage of M0 changes from Vofs to Vdata, and as the source of M0 is floating, ΔVs=(1−b)ΔVg, where ΔVs is the change amount of the source voltage of M0, ΔVg is the change amount of the gate voltage of M0; B is equal to $C1_z/(C1_z+C2_z)$, $C1_z$ is the capacitance of C1, and $C2_z$ is the capacitance of C2:

$$\Delta Vg=V\text{data}-Vdd+(Vini-|Vth|)/a+Vini;$$

$$\Delta Vs=(1-b)\times(V\text{data}-Vdd+(Vini-|Vth|)/a+Vini);$$

$Vs$ becomes $Vdd-(Vini-|Vth|)/a+(1-b)\times(V\text{data}-Vdd+(Vini-|Vth|)/a+Vini)$.

that is, $Vs$ becomes $V\text{data}+Vini-b\times V\text{data}+b\times Vdd-b\times(Vini-|Vth|)/a-b\times Vini$;

$$|Vgs|=(1-b/a-b)\times Vin+b\times|Vth|/a+b\times(Vdd-Vdata).$$

In the light-emitting phase t4, S1 provides a low voltage signal, S2 provides a high voltage signal, S3 provides a high voltage signal, S4 provides a low voltage signal, M4 is turned on, M2 and M3 are turned off, M1 is turned off, and M0 drives O1 to emit light; the drive current Ioled through O1 is as follows:

$$Ioled=K\big((1-b/a-b)\times Vini+b\times(Vdd-Vdata)+(b/a-1)\times|Vth|\big)^2.$$

As can be seen from the above formulas, when b/a is equal to 1, Ioled is not related to Vth, and in this case, $$Ioled=K(b\times(Vdd-Vdata)-b\times Vini)^2.$$

When the pixel circuit of at least one embodiment of the present disclosure as shown in FIG. 4 is in operation, in the initialization phase t1, the self-discharge phase t2 and the data writing phase t3, M1 is a shunt device which, when O1 does not emit light, shunts the current, so as to enhance the contrast.

A driving method according to an embodiment of the present disclosure is applied to the pixel circuit described above. A display cycle includes a non-light-emitting phase and a light-emitting phase which are sequentially set, and the non-light-emitting phase includes an initialization phase, a self-discharge phase, and a data writing phase which are sequentially set. The driving method includes:

in the initialization phase, the self-discharge phase and the data writing phase, a first control circuit writes a first initial voltage provided by a first initial voltage terminal into a first electrode of a light-emitting element under control of a first control signal to control the light-emitting element not to emit light, and clears and shunts residual charge of the first electrode of the light-emitting element; and in the data writing phase, a data writing circuit writes a data voltage provided by a data line into a control terminal of a driving circuit under control of a writing control signal.

In the driving method according to the embodiment of the present disclosure, in the non-light-emitting phase, the first control circuit writes the first initial voltage into the first electrode of the light-emitting element under control of the first control signal to control the light-emitting element not to emit light;

the transistor included in the first control circuit is a shunt device which, in the non-light-emitting phase, shunts the current, so as to increase the contrast.

In at least one embodiment of the present disclosure, the pixel circuit further includes a reset circuit; the driving method further includes:

in the initialization phase, a reset circuit writes a second initial voltage provided by a second initial voltage terminal into the control terminal of the driving circuit under control of a reset control signal, so that at the start of the self-discharge phase, the driving circuit controls a first terminal of the driving circuit to be connected to a second terminal of the driving circuit under control of a potential of the control terminal of the driving circuit; and at the start of the self-discharge phase, the driving circuit controls the first terminal of the driving circuit to be connected to the second terminal of the driving circuit under control of the potential of the control terminal of the driving circuit, and changes a potential of the first terminal of the driving circuit by discharge until the driving circuit controls the first terminal of the driving circuit to be disconnected from the second terminal of the driving circuit.

In at least one embodiment of the present disclosure, the pixel circuit further includes a light-emitting control circuit, and the driving method further includes:

in the initialization phase, the light-emitting control circuit controls a first voltage terminal to be connected to the first terminal of the driving circuit under control of a light-emitting control signal;

in the self-discharge phase and the data writing phase, the light-emitting control circuit controls the first voltage terminal to be disconnected from the first terminal of the driving circuit under control of the light-emitting control signal; and in the light-emitting phase, the first control circuit disconnects the first initial voltage terminal from the first electrode of the light-emitting element under control of a first control signal, the light-emitting control circuit controls the first voltage terminal to be connected to the first terminal of the driving circuit under control of the light-emitting control signal, and the driving circuit drives the light-emitting element to emit light.

In at least one embodiment of the present disclosure, in the display cycle, a time period for which the first control circuit writes the first initial voltage into the first electrode of the light-emitting element is longer than a time period for which the light-emitting control circuit controls the first voltage terminal to be disconnected from the first terminal of the driving circuit.

The display device described in this embodiment includes the pixel circuit described above.

The display device provided by the embodiments of the present disclosure may be a mobile phone, a tablet computer, a television, a display, a notebook computer, a digital photo frame, a navigator, or any product or component with display functions.

While the foregoing is directed to the preferred embodiments of the present disclosure, it will be understood by those skilled in the art that numerous modifications and adaptations may be made without departing from the principles of the disclosure, and such modifications and adaptations are intended to be within the scope of the disclosure.

What is claimed is:

1. A pixel circuit, comprising a light-emitting element, a data writing circuit, a first control circuit, a driving circuit, a first power storage circuit, and a second power storage circuit, wherein:

the first control circuit is electrically connected to a first control terminal, a first electrode of the light-emitting element and a first initial voltage terminal, and is configured to write a first initial voltage provided by the first initial voltage terminal into the first electrode of the light-emitting element under control of a first control signal provided by the first control terminal in a non-light-emitting phase;

a first terminal of the first power storage circuit is electrically connected to a control terminal of the driving circuit, a second terminal of the first power storage circuit is electrically connected to a first terminal of the driving circuit, and the first power storage circuit is configured to store electric energy;

a first terminal of the second power storage circuit is electrically connected to the first terminal of the driving circuit, a second terminal of the second power storage circuit is electrically connected to a first voltage terminal, and the second power storage circuit is configured to store electric energy;

the data writing circuit is electrically connected to a writing control terminal, a data line and the control terminal of the driving circuit, and is configured to write a data voltage provided by the data line into the control terminal of the driving circuit under control of a writing control signal provided by the writing control terminal;

a second terminal of the driving circuit is electrically connected to the first electrode of the light-emitting element, and the driving circuit is configured to drive the light-emitting element to emit light under control of a potential of the control terminal of the driving circuit; a second electrode of the light-emitting element is electrically connected to a second voltage terminal;

the pixel circuit further comprises a reset circuit, the reset circuit is electrically connected to a reset control terminal, a second initial voltage terminal, and the control terminal of the driving circuit, and the reset circuit is configured to write a second initial voltage provided by the second initial voltage terminal into the control terminal of the driving circuit under control of a reset control signal provided by the reset control terminal;

the pixel circuit further comprises a light-emitting control circuit, the light-emitting control circuit is electrically connected to a light-emitting control terminal, the first voltage terminal, and the first terminal of the driving circuit, and the light-emitting control circuit is configured to control the first voltage terminal to be connected to the first terminal of the driving circuit under control of a light-emitting control signal provided by the light-emitting control terminal;

the first control circuit comprises a first transistor, a control electrode of the first transistor is electrically connected to the first control terminal, a first electrode of the first transistor is electrically connected to the first initial voltage terminal, and a second electrode of the first transistor is electrically connected to the first electrode of the light-emitting element;

the light-emitting control circuit comprises a fourth transistor, a control electrode of the fourth transistor is electrically connected to the light-emitting control terminal, a first electrode of the fourth transistor is electrically connected to the first voltage terminal, and a second electrode of the fourth transistor is electrically connected to the first terminal of the driving circuit;

the first transistor is an n-type transistor, the fourth transistor is a p-type transistor, the first control terminal is configured to provide a first control signal, and the light-emitting control terminal is configured to provide a light-emitting control signal; and in a display cycle, a time period for which a potential of a first control signal connected to the control electrode of the first transistor is maintained at a high voltage is longer than a time period for which a potential of a light-emitting control signal connected to the control electrode of the fourth transistor is maintained at the high voltage.

2. The pixel circuit according to claim 1, wherein the first power storage circuit comprises a first capacitor, and the second power storage circuit comprises a second capacitor;

a first terminal of the first capacitor is electrically connected to the control terminal of the driving circuit, and a second terminal of the first capacitor is electrically connected to the first terminal of the driving circuit;

a first terminal of the second capacitor is electrically connected to the first terminal of the driving circuit, and a second terminal of the second capacitor is electrically connected to a first voltage terminal.

3. The pixel circuit according to claim 1, wherein the data writing circuit comprises a second transistor, and the driving circuit comprises a driving transistor;

a control electrode of the second transistor is electrically connected to the writing control terminal, a first electrode of the second transistor is electrically connected to the data line, and a second electrode of the second transistor is electrically connected to the control terminal of the driving circuit;

a control electrode of the driving transistor is the control terminal of the driving circuit, a first electrode of the driving circuit is the first terminal of the driving circuit, and a second electrode of the driving circuit is the second terminal of the driving circuit.

4. The pixel circuit according to claim 1, wherein the reset circuit comprises a third transistor;

a control electrode of the third transistor is electrically connected to the reset control terminal, a first electrode of the third transistor is electrically connected to the second initial voltage terminal, and a second electrode of the third transistor is electrically connected to the control terminal of the driving circuit.

5. A driving method applied to the pixel circuit of claim 1, wherein a display cycle comprises a non-light-emitting phase and a light-emitting phase which are sequentially set, and the non-light-emitting phase comprises an initialization phase, a self-discharge phase, and a data writing phase which are sequentially set; the driving method comprises:

in the initialization phase, the self-discharge phase and the data writing phase, a first control circuit writes a first initial voltage provided by a first initial voltage terminal into a first electrode of a light-emitting element under control of a first control signal to control the light-emitting element not to emit light, and clears and shunts residual charge of the first electrode of the light-emitting element; and in the data writing phase, a data writing circuit writes a data voltage provided by a data line into a control terminal of a driving circuit under control of a writing control signal.

6. The driving method according to claim 5, wherein the pixel circuit further comprises a reset circuit; the driving method further comprises:

in the initialization phase, a reset circuit writes a second initial voltage provided by a second initial voltage terminal into the control terminal of the driving circuit under control of a reset control signal, so that at the start of the self-discharge phase, the driving circuit controls a first terminal of the driving circuit to be connected to a second terminal of the driving circuit under control of a potential of the control terminal of the driving circuit; and at the start of the self-discharge phase, the driving circuit controls the first terminal of the driving circuit to be connected to the second terminal of the driving circuit under control of the potential of the control terminal of the driving circuit, and changes a potential of the first terminal of the driving circuit by discharge until the driving circuit controls the first terminal of the driving circuit to be disconnected from the second terminal of the driving circuit.

7. The driving method according to claim 6, wherein the pixel circuit further comprises a light-emitting control circuit, and the driving method further comprises:

in the initialization phase, the light-emitting control circuit controls a first voltage terminal to be connected to the first terminal of the driving circuit under control of a light-emitting control signal;

in the self-discharge phase and the data writing phase, the light-emitting control circuit controls the first voltage terminal to be disconnected from the first terminal of the driving circuit under control of the light-emitting control signal; and in the light-emitting phase, the first control circuit disconnects the first initial voltage terminal from the first electrode of the light-emitting element under control of a first control signal, the light-emitting control circuit controls the first voltage terminal to be connected to the first terminal of the driving circuit under control of the light-emitting control signal, and the driving circuit drives the light-emitting element to emit light.

8. The driving method according to claim 7, wherein in the display cycle, a time period for which the first control circuit writes the first initial voltage into the first electrode of the light-emitting element is longer than a time period for which the light-emitting control circuit controls the first voltage terminal to be disconnected from the first terminal of the driving circuit.

9. A display device comprising the pixel circuit of claim 1.

* * * * *